(12) United States Patent
Kurimoto et al.

(10) Patent No.: US 10,611,569 B2
(45) Date of Patent: Apr. 7, 2020

(54) PICKING SYSTEM

(71) Applicant: SHARP KABUSHIKI KAISHA, Sakai, Osaka (JP)

(72) Inventors: Eiji Kurimoto, Sakai (JP); Kazushi Horita, Sakai (JP); Naohisa Tsutada, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 100 days.

(21) Appl. No.: 16/116,749

(22) Filed: Aug. 29, 2018

(65) Prior Publication Data

US 2019/0062056 A1 Feb. 28, 2019

(30) Foreign Application Priority Data

Aug. 31, 2017 (JP) ................................. 2017-167310

(51) Int. Cl.
*B65G 1/137* (2006.01)
*G06Q 10/08* (2012.01)
*G06Q 50/28* (2012.01)
*H04W 84/12* (2009.01)

(52) U.S. Cl.
CPC ......... *B65G 1/1373* (2013.01); *G06Q 10/087* (2013.01); *G06Q 50/28* (2013.01); *H04W 84/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,392,948 B2* | 7/2008 | Smith | .................. | G06Q 10/087 235/383 |
| 9,171,278 B1* | 10/2015 | Kong | .................. | G06Q 10/087 |
| 9,451,674 B1* | 9/2016 | Kong | .................. | H05B 47/155 |
| 10,017,323 B2* | 7/2018 | Ambrose | .............. | G06Q 10/087 |

(Continued)

FOREIGN PATENT DOCUMENTS

JP 2008-302988 A 12/2008

*Primary Examiner* — Kyle O Logan
(74) *Attorney, Agent, or Firm* — ScienBiziP, P.C.

(57) ABSTRACT

A picking system includes a management apparatus, wireless communicator-indicators, an autonomous transport device, and a local-area wireless communication device. The management apparatus transmits picking-instruction information to the autonomous transport device via the local-area wireless communication device. The autonomous transport device receives the picking-instruction information and moves to a target storage position, which is one of storages positions where one or more picking items specified by the picking-instruction information are stored. In a state in which the autonomous transport device has reached a position within a communication range of a target wireless communicator-indicator, which is one of the wireless communicator-indicators disposed so as to correspond to the target storage position, the autonomous transport device transmits an indication instruction to the target wireless communicator-indicator. The target wireless communicator-indicator receives the indication instruction and indicates the target storage position to the operator.

7 Claims, 5 Drawing Sheets

(56) References Cited

U.S. PATENT DOCUMENTS

| | | | | |
|---|---|---|---|---|
| 2002/0070846 A1* | 6/2002 | Bastian, II | ............... | G06F 3/147 340/5.92 |
| 2004/0083144 A1* | 4/2004 | Venema | ............... | G06Q 10/087 705/28 |
| 2005/0128751 A1* | 6/2005 | Roberge | .................... | F21K 9/00 362/276 |
| 2006/0232412 A1* | 10/2006 | Tabacman | ........... | G06K 7/10861 340/572.1 |
| 2008/0055084 A1* | 3/2008 | Bodin | .................... | G06Q 10/08 340/572.1 |
| 2013/0317642 A1* | 11/2013 | Asaria | .................... | G06Q 50/28 700/216 |
| 2014/0209547 A1* | 7/2014 | Villalobos | ............... | A47B 49/00 211/36 |
| 2015/0073589 A1* | 3/2015 | Khodl | .................... | B25J 5/007 700/218 |
| 2016/0132659 A1* | 5/2016 | Vaz | .................... | G06F 19/3462 700/242 |
| 2017/0015502 A1* | 1/2017 | Engel | .................... | B65G 1/065 |

* cited by examiner

PICKING SYSTEM

BACKGROUND

1. Field

The present disclosure relates to a picking system.

2. Description of the Related Art

In some existing picking systems, a rack has compartments, different types of items are stored in respective compartments, and a management computer instructs an operator which items are to be picked.

Regarding an operation of storing items, there has been proposed a system that includes light-emitting devices, which are disposed in a rack and indicate storage positions, and a management server. The management server wirelessly communicates with each of the light-emitting devices via a plurality of wireless LAN base stations, which are disposed on the floor on which the rack is installed. The management server controls the indication states of the light-emitting devices disposed at the storage positions (see, for example, Japanese Unexamined Patent Application Publication No. 2008-302988).

The system described in Japanese Unexamined Patent Application Publication No. 2008-302988 has a structure such that the management server wirelessly communicates with each of the light-emitting devices (wireless communicator-indicators). With this structure, the layout of the system can be easily changed, because it is not necessary to change communication wiring when changing racks or compartments. However, making communication wireless is insufficient, and it is desirable to supply electric power without using power cables. Therefore, it is desirable to use battery-powered wireless communicator-indicators.

In order to save the battery power, it is undesirable that the wireless communicator-indicators consume large electric power for transmission. However, if the transmission power is limited, the communication range is limited. For example, when using a plurality of wireless LAN base stations and antennas as in the system described in Japanese Unexamined Patent Application Publication No. 2008-302988, it is necessary to dispose the wireless LAN base stations and the antennas at predetermined distances so as to compensate for the limited communication range of each of the wireless communicator-indicators.

As electric power used for wireless communication is reduced, the numbers of wireless base stations and antennas to be disposed increase. Accordingly, the cost and man-hours for installing wireless base stations and antennas increase. Moreover, if wireless communication is performed with a weak radio wave, a so-called null point, which is a point where a radiated radio wave interferes with a reflected radio wave, tends to be formed. Likewise, if a large number of antennas simultaneously perform transmission, a null point tends to be formed due to interference between radio waves radiated from different antennas.

It is desirable to provide a picking system that can perform stable communication with a small electric power by using limited numbers of wireless base stations and antennas.

Moreover, the system described in Japanese Unexamined Patent Application Publication No. 2008-302988 does not take into consideration the timing at which the light-emitting device emits light. Therefore, the light-emitting device starts emitting light at a time before an operator reaches a picking operation position, when the operator is far from the picking operation position. This means that the light-emitting device wastes energy.

SUMMARY

It is desirable to provide a picking system that can perform stable communication with wireless communicator-indicators by using limited numbers of wireless base stations and antennas and that takes energy efficiency into consideration.

According to an aspect of the disclosure, there is provided a picking system including a management apparatus that manages progress of a picking operation, one or more wireless communicator-indicators that are disposed so as to correspond to one or more storage positions of picking items, an autonomous transport device, and a local-area wireless communication device via which the management apparatus communicates with the autonomous transport device. The autonomous transport device includes a long-distance wireless communication circuit that communicates with the management apparatus via the local-area wireless communication device, and a transport-side short-distance wireless communication circuit that communicates with the wireless communicator-indicators. Each of the wireless communicator-indicators includes an indicator-side short-distance wireless communication circuit that communicates with the autonomous transport device, and an indication unit that indicates a corresponding one of the storage positions of the picking items to an operator. The management apparatus transmits picking-instruction information to the autonomous transport device via the local-area wireless communication device. The autonomous transport device receives the picking-instruction information and moves to a target storage position, which is one of the storages positions where one or more of the picking items specified by the picking-instruction information are stored, and, in a state in which the autonomous transport device has reached a position within a communication range of a target wireless communicator-indicator, which is one of the wireless communicator-indicators disposed so as to correspond to the target storage position, the autonomous transport device transmits an indication instruction to the target wireless communicator-indicator. The target wireless communicator-indicator receives the indication instruction and indicates the target storage position to the operator via the indication unit.

DESCRIPTION OF THE EMBODIMENTS

Hereinafter, the present disclosure will be described in detail with reference to the drawings. The following description is exemplary in all respects, and it should not be understood that the following description limit the present disclosure.

First Embodiment

Figure 1:
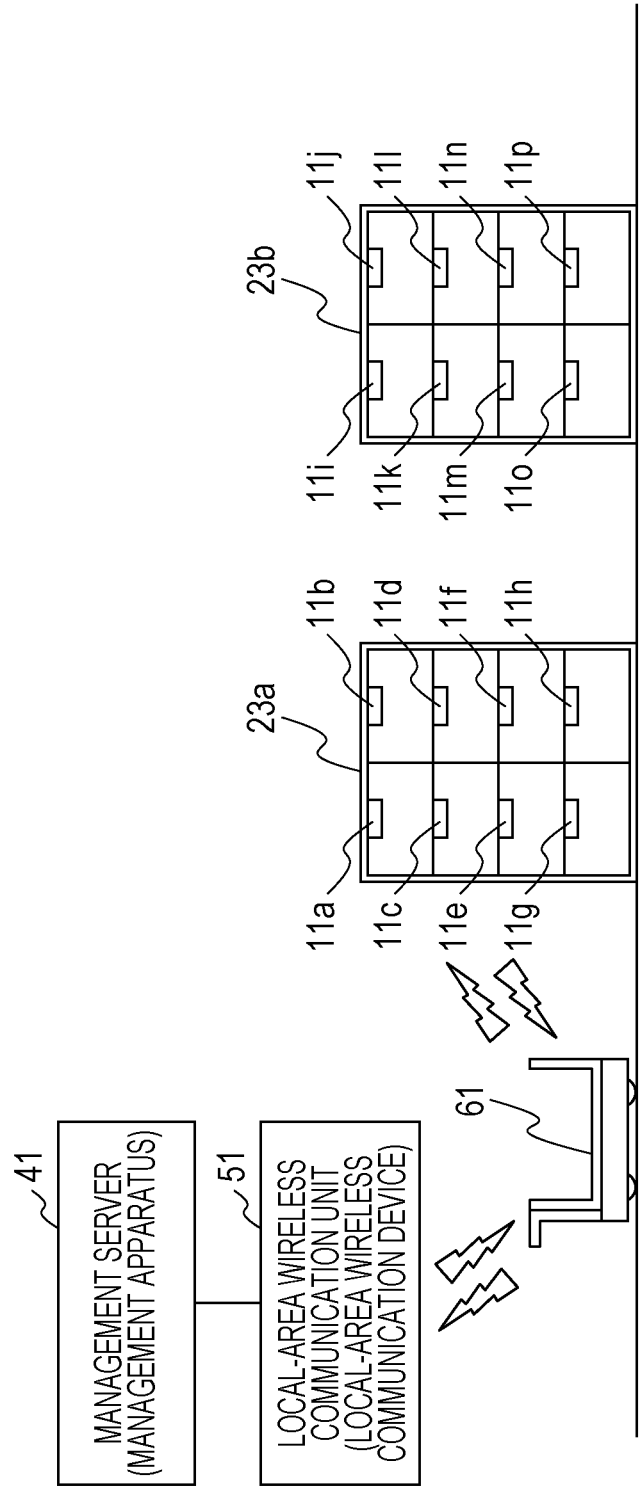
FIG. 1 illustrates a picking system according to a first embodiment.
Figure 2:
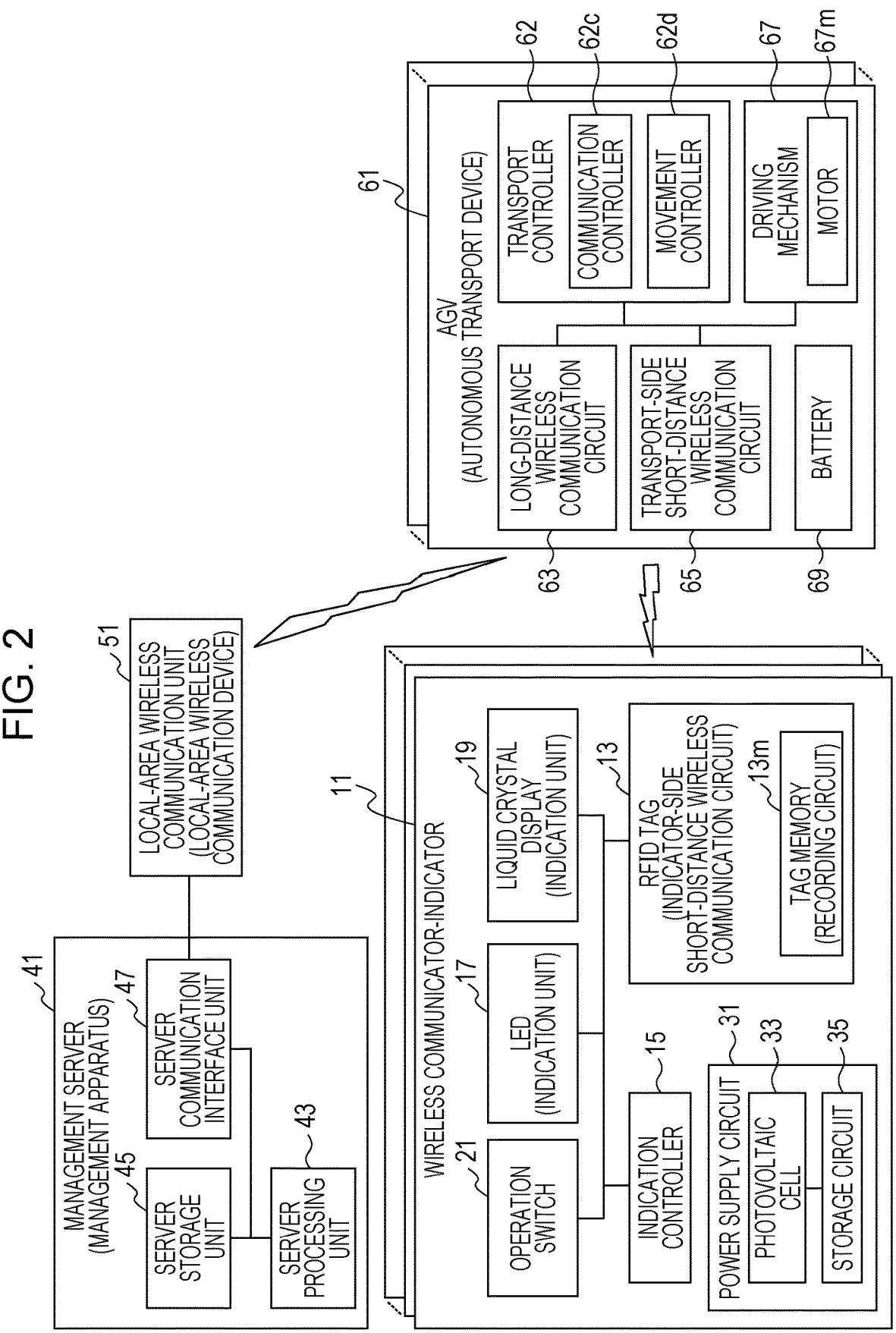
FIG. 2 is a block diagram of the picking system according to the first embodiment.
Figure 3:
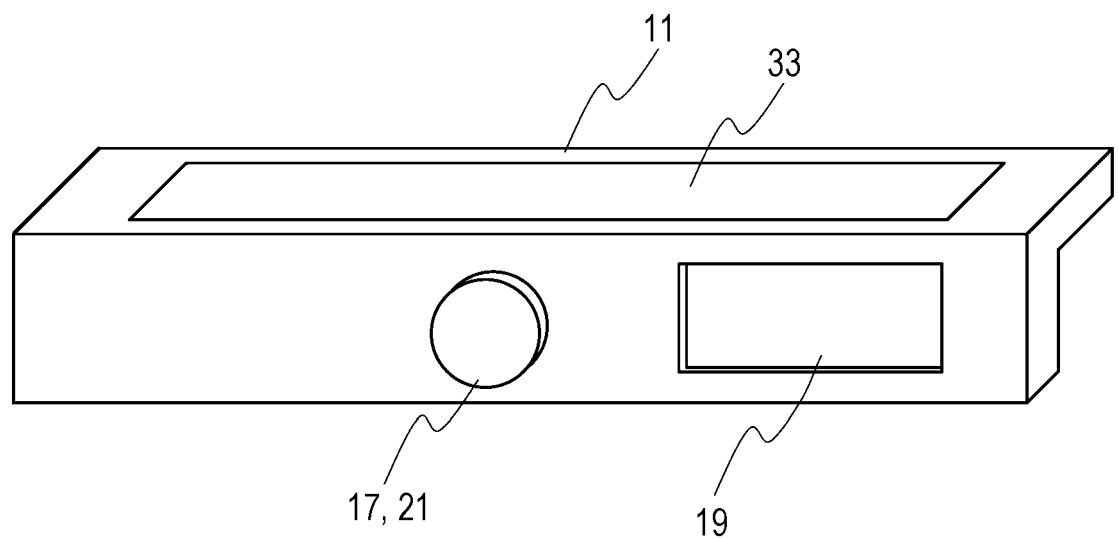
FIG. 3 is an external view of a wireless communicator-indicator according to the first embodiment.

FIG. 1 illustrates a picking system according to a first embodiment. FIG. 2 is a block diagram of the picking system according to the first embodiment. FIG. 3 is an external view of a wireless communicator-indicator according to the first embodiment.

As illustrated in FIG. 1, in the picking system according to the first embodiment, items to be picked are stored in racks 23a, 23b, . . . in a local area. The racks 23a, 23b, . . . are each divided into a plurality of compartments, and different types of items are stored in different compartments. Wireless communicator-indicators 11a to 11h, 11i to 11p, . . . are disposed so as to correspond to the respective compartments.

The wireless communicator-indicators 11a to 11h, 11i to 11p, . . . have the same structure. FIGS. 2 and 3 shows a wireless communicator-indicator 11 as an example of these.

A management server 41 corresponds to a management apparatus according to the present disclosure. The management server 41 manages the positions of compartments of the racks 23a, 23b, . . . , in which items are stored in accordance with the types of the items, and the number of items stored in each of the compartments. Moreover, the management server 41 manages the operations of one or more automatic guided vehicles 61 (hereinafter referred to as the "AGVs 61") and moves the AGVs 61 to one or more storage positions where picking items to be transported are stored. Moreover, the management server 41 transmits, to the AGVs 61, picking-instruction information including information on the wireless communicator-indicators 11 corresponding to the picking items to be picked.

The management server 41 includes a server processing unit 43 including a CPU, a server storage unit 45 including a memory, and a server communication interface unit 47. The server communication interface unit 47 wirelessly communicates with the AGVs 61 via a local-area wireless communication unit 51.

The local-area wireless communication unit 51 corresponds to a local-area wireless communication device according to the present disclosure. The local-area wireless communication unit 51 wirelessly transmits an instruction from the management server 41 to the AGVs 61. In the first embodiment, the local-area wireless communication unit 51 is a so-called wireless LAN access point.

Each of the AGVs 61 corresponds to an autonomous transport device according to the present disclosure. One or more AGVs 61 move in the local area and transport items. The management server 41 moves the AGVs 61 to positions near the storage positions of picking items. In accordance with indication by the wireless communicator-indicator 11, an operator takes out picking items from a corresponding compartment and places the picking items on one of the AGVs 61 that has moved nearby.

As illustrated in FIG. 3, the wireless communicator-indicator 11 according to the first embodiment is substantially L-shaped. The wireless communicator-indicator 11 has an upper panel where a photovoltaic cell 33 is disposed and a front panel where a self-illuminating operation switch 21, which is illuminated by an LED 17, is disposed. The front panel also has a liquid crystal display 19. The LED 17 and the liquid crystal display 19 each correspond to an indication unit.

As illustrated in FIG. 2, the wireless communicator-indicator 11 includes an RFID tag 13, an indication controller 15, the LED 17, the liquid crystal display 19, the operation switch 21, and a power supply circuit 31. The RFID tag 13 has a tag memory 13m as a recording circuit. The tag memory 13m stores identification information, which is specific to the RFID tag 13, beforehand. The specific information is used as identification information specific to the wireless communicator-indicator 11.

The RFID tag 13 corresponds to an indicator-side short-distance wireless communication circuit. The indication controller 15 includes a microcomputer. When the RFID tag 13 receives an indication instruction, in response, the indication controller 15 causes the indication unit to perform indication.

Under the control of the indication controller 15, the LED 17 emits light to indicate the position of picking items to an operator. The liquid crystal display 19 indicates, to the operator, the number of picking items to be picked.

In the first embodiment, the operation switch 21 is a push switch. The operator operates the operation switch 21 by touching it. The operator takes out picking items in the number shown on the liquid crystal display 19, places the picking items on the AGV 61, and then operates the operation switch 21. In response to the operation on the switch 21, the indication controller 15 causes the indication unit to stop indication and causes the RFID tag 13 to transmit a picking completion signal to a transport-side short-distance wireless communication circuit 65. Alternatively, the indication controller 15 may change predetermined data in the tag memory 13m into data that reflects completion of picking.

When the transport-side short-distance wireless communication circuit 65 receives the picking completion signal from the RFID tag 13, a communication controller 62c of the AGV 61 controls a long-distance wireless communication circuit 63 to transmit a picking completion signal to the management server 41. Alternatively, after transmitting the indication instruction, the communication controller 62c may successively check the tag memory 13m of the RFID tag 13, and, if the predetermined data in the tag memory 13m is changed to data that reflects completion of picking, the communication controller 62c may control the long-distance wireless communication circuit 63 to transmit a picking completion signal to the management server 41.

On the management server 41 side, when the server communication interface unit 47 receives the picking completion signal via the local-area wireless communication unit 51, the server processing unit 43 sends an instruction to move the AGV 61 the next target position. Note that, when picking is complete, that is, when the operator has placed the picking items on the AGV 61, the AGV 61 is located near the storage position of the picking items and within a communication range of the RFID tag 13.

As described above, the wireless communicator-indicator 11 communicates with the AGV 61 by using the RFID tag 13. The wireless communicator-indicator 11 includes the RFID tag 13 to enable wireless communication.

In the first embodiment, the power supply circuit 31 includes the photovoltaic cell 33 and a storage circuit 35. The storage circuit 35 stores electric power generated by the photovoltaic cell 33. The wireless communicator-indicator 11 includes the power supply circuit 31 to enable power supply without using power cables.

As illustrated in FIG. 2, the AGV 61 includes a transport controller 62, the long-distance wireless communication circuit 63, the transport-side short-distance wireless communication circuit 65, a driving mechanism 67, and a battery 69.

In the first embodiment, the transport controller 62 includes a microcomputer and functionally includes the communication controller 62c and a movement controller 62d.

The communication controller 62c processes wireless communication with the management server 41 via the long-distance wireless communication circuit 63 and the local-area wireless communication unit 51. Moreover, The communication controller 62c processes wireless communication with the wireless communicator-indicator 11 via the transport-side short-distance wireless communication circuit 65.

The movement controller 62d controls movement of the AGV 61 using the driving mechanism 67.

The long-distance wireless communication circuit 63 is a communication interface for communicating with the management server 41 via the local-area wireless communication unit 51, which is a wireless LAN access point. In the first embodiment, the long-distance wireless communication circuit 63 is a wireless LAN communication interface circuit.

The transport-side short-distance wireless communication circuit 65 is a communication interface for communicating with the wireless communicator-indicator 11 nearby. In the first embodiment, the transport-side short-distance wireless communication circuit 65 is an RFID tag reader-writer.

The driving mechanism 67 includes a motor 67m, which is a driving source for moving the AGV 61; wheels; a power transmission mechanism, which transmits driving power of the motor 67m to the wheels; and the like.

The battery 69 supplies electric power to the motor 67m; and also supplies electric power to the transport controller 62, the long-distance wireless communication circuit 63, and the transport-side short-distance wireless communication circuit 65.

The AGV 61 according to the first embodiment moves along a line for guiding movement (not shown in FIG. 1), which is disposed on the floor in the local area along the racks 23a, 23b, . . . .

The line is disposed on a route along which the AGV 61 moves. In the first embodiment, the line is formed by a magnetic tape affixed onto the route.

The driving mechanism 67 moves the AGV 61 forward and backward, rotates the AGV 61, and moves the AGV 61 in other ways. The AGV 61 includes a line sensor (not shown in FIG. 2) for detecting the line on the floor.

There are branching points and intersecting points of the line in the local area. The management server 41 provides the AGV 61 with an instruction on which route to choose at the branching points and the intersecting points. The movement controller 62d of the AGV 61 controls movement of the AGV 61 based on the instruction.

The management server 41 manages the position of the AGV 61 that moves along the line. The position of the AGV 61 is acquired as follows.

Markers showing specific positions are placed on the line beforehand. The AGV 61 includes a marker sensor (not shown in FIG. 2) that detects position information that is specific to each the markers and that is provided by the marker. When the AGV 61 moves over a marker, the marker sensor detects the position information specific to the marker when moving past the marker. When the marker sensor detects the position information, the transport controller 62 causes the long-distance wireless communication circuit 63 to transmit the position information to the management server 41.

Alternatively, the AGV 61 may include a gyrosensor (not shown in FIG. 2), may successively detect movement thereof from a reference position (home position) in the local area, and may transmit information indicating the movement to the management server 41.

Alternatively, by using a combination of the two methods described above, positions between markers may be interpolated by using the information from the gyrosensor.

After determining a procedure for the picking operation, the management server 41 transmits to the AGV 61, via the server communication interface unit 47 and the local-area wireless communication unit 51, a movement instruction to move the AGV 61 to the storage position of picking items.

Then, the management server 41 transmits picking-instruction information to the AGV 61.

The picking-instruction information includes identification information that is specific to the wireless communicator-indicator 11 corresponding to the picking items and the number of the picking items. The identification information coincides with the identification information that is stored beforehand in the tag memory 13m of the wireless communicator-indicator 11 and is used to discriminate the wireless communicator-indicator 11 from other wireless communicator-indicators.

When receiving the picking-instruction information from the management server 41 via the long-distance wireless communication circuit 63, the communication controller 62c of the AGV 61 controls the transport-side short-distance wireless communication circuit 65 to transmit an indication instruction to the wireless communicator-indicator corresponding to the identification information included in the picking-instruction information.

However, if the distance to the wireless communicator-indicator 11 corresponding to the identification information is too large, communication fails and a response indicating receipt from the wireless communicator-indicator 11 is not received. In this case, the communication controller 62c resends the indication instruction. The communication controller 62c repeats resending the indication instruction until a response from the wireless communicator-indicator 11 is received. As the AGV 61 approaches the storage position of the picking item, the distance to the wireless communicator-indicator 11 decreases, and the response is received. When receiving the indication instruction, the wireless communicator-indicator 11 starts indication.

In the first embodiment, the RFID tag 13 performs wireless communication by using a radio wave having a frequency of about 900 MHz, which is in the UHF band. The RFID tag 13 has a communication range of about 2 to 3 meters.

In the first embodiment, the management server 41 sends to a movement instruction to the AGV 61 to move the AGV 61 to the storage position of the picking items and also transmits a picking-instruction information to the AGV 61 to cause the wireless communicator-indicator 11 to perform indication.

Figure 4:
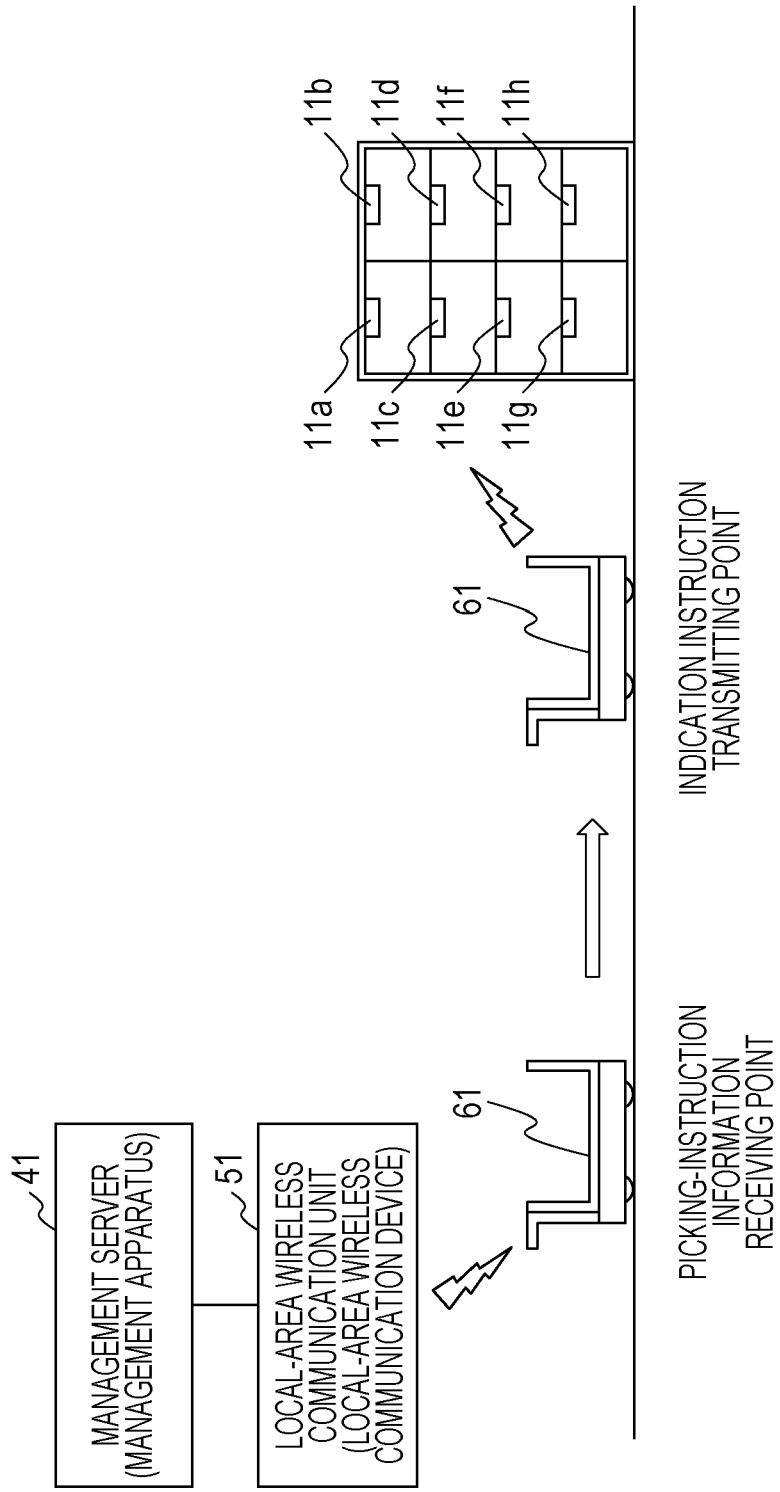
FIG. 4 illustrates a state in which an AGV approaches a target wireless communicator-indicator, enters a communication range, and transmits an indication instruction in the first embodiment.

FIG. 4 illustrates a state in which the AGV 61 approaches a target wireless communicator-indicator, enters the communication range, and transmits an indication instruction in the first embodiment. As illustrated in FIG. 4, the AGV 61 receives picking-instruction information from the management server 41 at a picking-instruction information receiving point.

When receiving the picking-instruction information, the AGV 61 tries to communicate with the wireless communicator-indicator 11 corresponding to identification information included in the received picking-instruction information. In FIG. 4, at the picking-instruction information receiving point, the AGV 61 is far from the wireless communicator-indicator 11 and is not within the communication range of the wireless communicator-indicator 11. Thus, communication with the wireless communicator-indicator 11 is not established.

While moving, the AGV 61 successively tries to communicate with the wireless communicator-indicator 11.

When the AGV 61 reaches a position near the storage position of the picking items, a response from the wireless communicator-indicator 11 is received. When the response is received, the AGV 61 transmits an indication instruction. This is performed at an indication instruction transmitting point.

Second Embodiment

In the first embodiment, the management server 41 transmits picking-instruction information even when the AGV 61 is still far from the storage position of the picking items.

In a second embodiment, the management server 41 transmits picking-instruction information only after the AGV 61 reaches a position within a predetermined distance (for example, 5 meters) from the storage position of the picking items. When receiving the picking-instruction information, the AGV 61 tries to communicate with a target wireless communicator-indicator 11. In this case, the AGV 61 does not unnecessarily repeat transmission of indication instruction when the AGV 61 is far from the target wireless communicator-indicator 11.

Third Embodiment

The management server 41 acquires the position of the AGV 61 and manages movement of the AGV 61. Thus, when the AGV 61 reaches a position near the storage position of the picking items, the management server 41 instructs the AGV 61 to stop, waits for a picking operator to finish picking and operate the operation switch 21, and then moves the AGV 61 to a position near the storage position of the next picking items.

In a third embodiment, the AGV 61 notifies the management server 41 that the AGV 61 has entered the communication range of the wireless communicator-indicator 11 and communication is established. After receiving the notification from the AGV 61 that communication with the wireless communicator-indicator 11 is established, the management server 41 sends a stop instruction to the AGV 61. In this case, the management server 41 can check that the AGV 61 is located at a position near the storage position of the picking items and then stop the AGV 61 near the position.

Fourth Embodiment

In the first embodiment, as illustrated in FIGS. 1 and 2, the local-area wireless communication unit 51 is independent from the management server 41. However, the management server 41 and the local-area wireless communication unit 51 may be integrated with each other.

Fifth Embodiment

In the first embodiment, as illustrated in FIG. 2, the AGV 61 includes the transport-side short-distance wireless communication circuit 65 and communicates with the RFID tag 13 of the wireless communicator-indicator 11. That is, the AGV 61 relays communication between the management server 41 and the wireless communicator-indicator 11.

In contrast, in a fifth embodiment, an information communication terminal, which is placed on the AGV 61 and moves together with the AGV 61, communicates with the RFID tag 13. That is, the information communication terminal, which moves together with the AGV 61, relays communication between the management server 41 and the wireless communicator-indicator 11. That is, the present disclosure includes a case where a communication device that is independent from the AGV 61 and that moves together with the AGV 61 performs functions equivalent to those of the long-distance wireless communication circuit and the transport-side short-distance wireless communication circuit.

Figure 5:
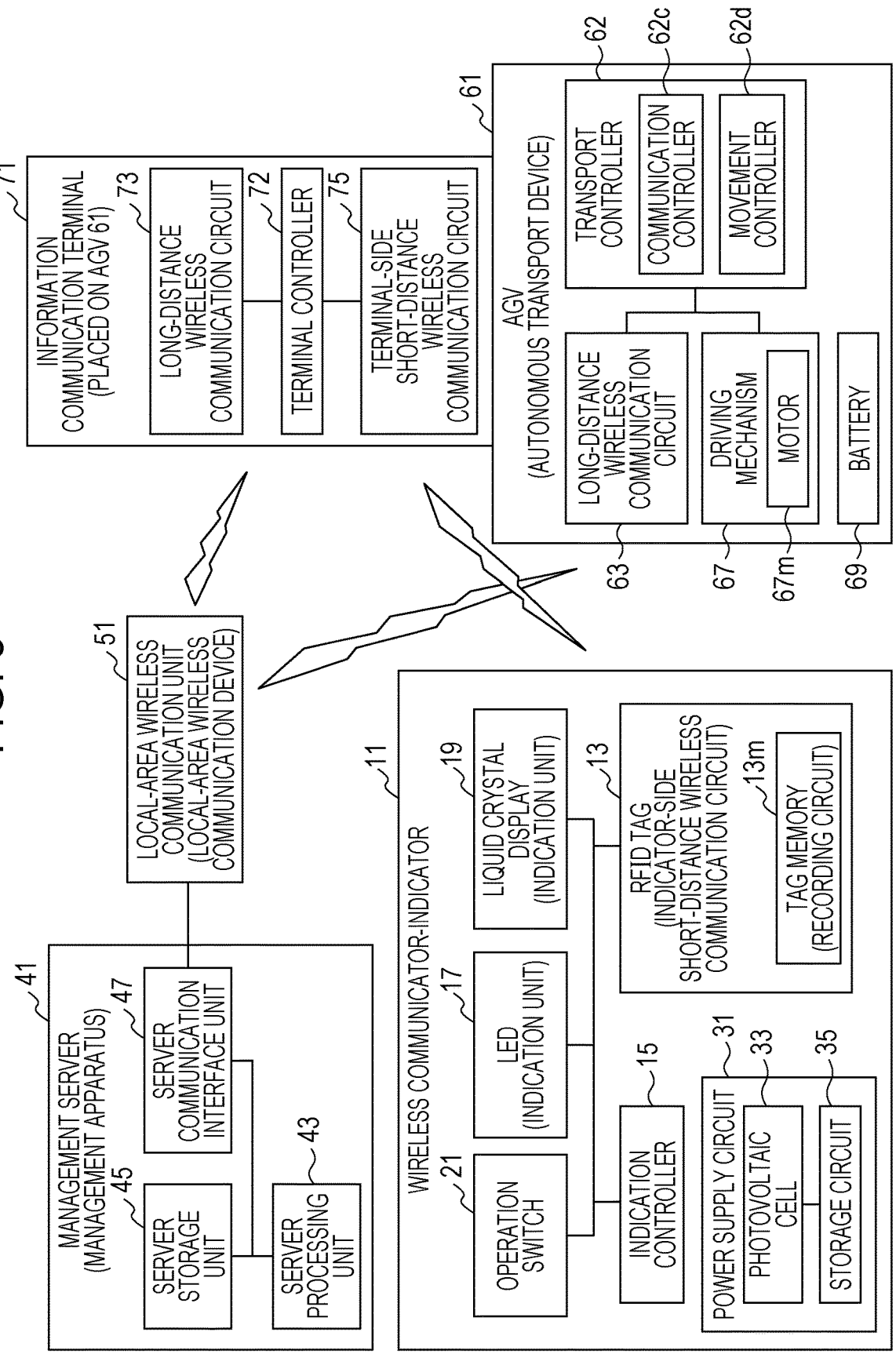
FIG. 5 is block diagram of a picking system according to a fifth embodiment, which is different from the picking system shown in FIG. 2.

FIG. 5 is block diagram of a picking system according to the fifth embodiment. As illustrated in FIG. 5, an information communication terminal 71 (such as a mobile computer or a tablet terminal), which is independent from the AGV 61, is placed on the AGV 61 and moves together with the AGV 61. The information communication terminal 71 may be fixed to the AGV 61 but need not be fixed and may be just placed on the AGV 61.

The information communication terminal 71 includes a long-distance wireless communication circuit 73, which communicates with the local-area wireless communication unit 51, and a terminal-side short-distance wireless communication circuit 75, which communicates with the RFID tag 13 of the wireless communicator-indicator 11. The information communication terminal 71 further includes a terminal controller 72 for controlling these circuits. To be specific, the terminal controller 72 is a CPU, and the long-distance wireless communication circuit 73 and the terminal-side short-distance wireless communication circuit 75 are communication interfaces. The terminal-side short-distance wireless communication circuit 75 is a substitute for the transport-side short-distance wireless communication circuit 65 shown in FIG. 2.

For example, regarding communication related to movement of the AGV 61, the management server 41 communicates with the AGV 61 via the local-area wireless communication unit 51 and the long-distance wireless communication circuit 63. Regarding communication related to the wireless communicator-indicator 11, such as transmission of picking-instruction information, the management server 41 communicates with the information communication terminal 71 via the local-area wireless communication unit 51 and the terminal-side short-distance wireless communication circuit 75. When receiving the picking-instruction information, the terminal controller 72 controls the terminal-side short-distance wireless communication circuit 75 to transmit an indication instruction to the wireless communicator-indicator 11.

As described above, in the fifth embodiment, the information communication terminal 71 relays communication between the management server 41 and the wireless communicator-indicator 11, but the AGV 61 does not relay the communication. However, electric power may be supplied from the battery 69 of the AGV 61 to the information communication terminal 71. The AGV 61 need not have the long-distance wireless communication circuit 63 and communicate with the management server 41 via the local-area wireless communication unit 51. Instead, the information communication terminal 71 may relay communication between the management server 41 and the AGV 61.

(i) As described above, a picking system according to the present disclosure includes a management apparatus that manages progress of a picking operation, one or more wireless communicator-indicators that are disposed so as to correspond to one or more storage positions of picking items, an autonomous transport device, and a local-area wireless communication device via which the management apparatus communicates with the autonomous transport device. The autonomous transport device includes a long-distance wireless communication circuit that communicates with the management apparatus via the local-area wireless communication device, and a transport-side short-distance wireless communication circuit that communicates with the wireless communicator-indicators. Each of the wireless communicator-indicators includes an indicator-side short-distance wireless communication circuit that communicates with the autonomous transport device, and an indication unit that indicates a corresponding one of the storage positions of the picking items to an operator. The management apparatus transmits picking-instruction information to the autonomous transport device via the local-area wireless communication device. The autonomous transport device receives the picking-instruction information and moves to a target storage position, which is one of the storages positions where one or more of the picking items specified by the picking-instruction information are stored, and, in a state in which the autonomous transport device has reached a position within a communication range of a target wireless communicator-indicator, which is one of the wireless communicator-indicators disposed so as to correspond to the target storage position, the autonomous transport device transmits an indication instruction to the target wireless communicator-indicator. The target wireless communicator-indicator receives the indication instruction and indicates the target storage position to the operator via the indication unit.

With the picking system according to the present disclosure, the management apparatus communicates with the wireless communicator-indicator corresponding to the storage position of picking items to be picked and causes the wireless communicator-indicator to indicate the storage position of the picking items. An operator picks up the picking items in accordance with the indication, and places the picking items on the autonomous transport device. Different picking items are stored at different storage positions, and the wireless communicator-indicators are disposed so as to correspond to the respective storage positions.

The management apparatus manages the positions and the numbers of items that are stored in racks and compartments in accordance with the types of the items. Moreover, the management apparatus manages one or more autonomous transport devises and moves the autonomous transport devices to one or more storage positions where picking items to be transported are stored. Moreover, the management apparatus sends instructions to the wireless communicator-indicators to indicate the storage positions of items to be transported by the autonomous transport devices, that is, picking items to be picked.

In the present disclosure, the instruction from the management apparatus to the wireless communicator-indicator is sent from the autonomous transport device or from a communication device that is independent from the autonomous transport device and that moves together with the autonomous transport device.

The autonomous transport device autonomously moves in a local area based on instruction from the management apparatus and moves to a position near the storage position of the picking items. When the operator picks the items from the storage position and places the items on the autonomous transport device, the autonomous transport device transports the items placed thereon and moves to the storage position of the next picking items or to a position where the items are to be loaded or unloaded. In the embodiment described above, the autonomous transport device is an automatic guided vehicle (AGV), which includes a battery and a motor as a driving source and which autonomously moves by using electric power supplied from the battery.

The local-area wireless communication device and the long-distance wireless communication circuit are used to perform communication between the autonomous transport device and the management apparatus. A specific example of each of these is a wireless LAN communication circuit in the embodiments described above. The method of wireless LAN communication may be based on any of various standards, such as IEEE802.11a, IEEE802.11b, IEEE802.11g, IEEE802.11n, and the like. The local-area wireless communication device corresponds to a so-called wireless LAN access point. The long-distance wireless communication circuit is not limited to a wireless LAN communication circuit and may be, for example, a wireless communication circuit based on IEEE802.15.4 or another standard.

The transport-side short-distance wireless communication circuit is a wireless communication circuit whose communication range is smaller than that of the long-distance wireless communication circuit. A specific example thereof is a communication circuit using the RFID tag in the embodiments described above. Communication using the RFID tag has a smaller communication range but can be performed with less electric power than wireless LAN communication.

The wireless communicator-indicator sends a signal (indication) to an operator in response to receiving of an indication instruction and enables the operator to recognize the position of picking items by using the signal. As a specific example, the indication may be performed by using a photoelectronic device, such as an LED or a liquid crystal display, as in the embodiments described above. However, for example, the indication may be performed by using a mechanical device, instead of a photoelectronic device. The indication may be performed by using any method and in any manner as long as an operator can recognize the position of items. For example, the indication may be performed by sending a signal via the visual sense, the auditory sense, or the like.

The indication instruction is an instruction transmitted by the management apparatus to cause the wireless communicator-indicator corresponding to the picking items to perform indication.

The picking instruction information is communication data transmitted by the management apparatus to the autonomous transport device, which is a relay point.

The indication instruction is communication data transmitted by the autonomous transport device, which is a relay point, to a target wireless communicator-indicator. Because the target wireless communicator-indicator corresponds to picking items, the autonomous transport device moves to a position near the target wireless communicator-indicator. When the autonomous transport device approaches the picking item and enters the communication range of the wireless communicator-indicator, the indication instruction is transmitted and the indication is performed. The operator recognizes the indication and places the picking items on the autonomous transport device that has approached. The autonomous transport device transports the items placed thereon.

Other aspects of the present disclosure will be described further.

(ii) If the autonomous transport device is not within the communication range of the target wireless communicator-indicator when the autonomous transport device receives the picking-instruction information, the autonomous transport device may move to a position within the communication range of the target wireless communicator-indicator and then transmit the indication instruction to the target wireless communicator-indicator.

In this case, even when the autonomous transport device receives picking-instruction information at a position that is not within the communication range of the target wireless communicator-indicator and whichever the storage position of the picking items may be, the storage position of the picking items is indicated to the operator when the autonomous transport device reaches a position near the storage position of the picking items.

Moreover, because indication is performed only after the autonomous transport device has reached a position near the storage position of the picking items, unnecessary consumption of electric power, which occurs if indication is performed when the autonomous transport device is located far from the storage position of the picking items, does not occur.

(iii) If the autonomous transport device is within the communication range of the target wireless communicator-indicator when the autonomous transport device receives the picking-instruction information, the autonomous transport device may immediately transmit the indication instruction to the target wireless communicator-indicator.

In this case, if the autonomous transport device is within the communication range of the target wireless communicator-indicator when the management apparatus transmits the picking-instruction information, the storage position of the picking item is immediately indicated to an operator.

(iv) The indicator-side short-distance wireless communication circuit may receive the indication instruction as a radio wave, convert the energy of the received radio wave into electric power, and record or output electronic information that reflects reception of the indication instruction by using the electric power; and each of the wireless communicator-indicators may perform indication based on the electronic information via the indication unit.

In this case, because the indicator-side short-distance wireless communication circuit, which operates by converting the energy of a radio wave for transmitting the indication instruction into electric power, receives the indication instruction, and records or outputs electronic information, it is not necessary to use another power supply for the receiving operation and for standby. Therefore, it is possible to realize a picking system that takes energy efficiency into consideration.

(v) The indicator-side short-distance wireless communication circuit may be an RFID tag, and the transport-side short-distance wireless communication circuit may be a communication circuit that communicates with the RFID tag.

In this case, it is possible to realize a short-distance wireless communication circuit by applying an RFID tag technology, which is inexpensive and excels in energy efficiency, to a picking system according to the present disclosure.

(vi) The management apparatus and the autonomous transport device may communicate with each other via a wireless LAN.

In this case, it is possible to perform communication in an area larger than that of the short-distance wireless communication circuit by using a wireless LAN technology for communication between the management apparatus and the autonomous transport device. Thus, it is possible to perform communication between the management apparatus and the autonomous transport device even when the autonomous transport device is located at any position in a local area where racks for storing the picking items are disposed.

(vii) The indication unit of each of the wireless communicator-indicators may include a light emitter that emits light for indication and a photovoltaic cell that generates electric power used by the light emitter to emit light.

In this case, it is not necessary to supply electric power for performing indication from the outside, because the wireless communicator-indicator performs indication by using electric power generated by the photovoltaic cell. Thus, it is possible to realize not only wireless communication but also power supply without using power cables.

Aspects of the present disclosure include any combination of the aspects described above.

The embodiments of the present disclosure described above may be modified in various ways. It should not be understood that such modifications are not included in the scope of the present disclosure. The present disclosure includes any modifications within the scope of the claims and the equivalents thereof.

The present disclosure contains subject matter related to that disclosed in Japanese Priority Patent Application JP 2017-167310 filed in the Japan Patent Office on Aug. 31, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A picking system comprising:
   a management apparatus that manages progress of a picking operation;
   one or more wireless communicator-indicators that are disposed so as to correspond to one or more storage positions of picking items;
   an autonomous transport device; and
   a local-area wireless communication device via which the management apparatus communicates with the autonomous transport device,
   wherein the autonomous transport device includes
      a long-distance wireless communication circuit that communicates with the management apparatus via the local-area wireless communication device, and
      a transport-side short-distance wireless communication circuit that communicates with the wireless communicator-indicators,
   wherein each of the wireless communicator-indicators includes
      an indicator-side short-distance wireless communication circuit that communicates with the autonomous transport device, and
      an indication unit that indicates a corresponding one of the storage positions of the picking items to an operator,
   wherein the management apparatus transmits picking-instruction information to the autonomous transport device via the local-area wireless communication device, wherein the autonomous transport device receives the picking-instruction information and moves to a target storage position, which is one of the storages positions where one or more of the picking items specified by the picking-instruction information are stored, and, in a state in which the autonomous transport device has reached a position within a communication range of a target wireless communicator-indicator, which is one of the wireless communicator-indicators disposed so as to correspond to the target storage position, the autonomous transport device transmits an indication instruction to the target wireless communicator-indicator, and wherein the target wireless communicator-indicator receives the indication instruction and indicates the target storage position to the operator via the indication unit.

2. The picking system according to claim 1,
wherein, if the autonomous transport device is not within the communication range of the target wireless communicator-indicator when the autonomous transport device receives the picking-instruction information, the autonomous transport device moves to a position within the communication range of the target wireless communicator-indicator and then transmits the indication instruction to the target wireless communicator-indicator.

3. The picking system according to claim 1,
wherein, if the autonomous transport device is within the communication range of the target wireless communicator-indicator when the autonomous transport device receives the picking-instruction information, the autonomous transport device immediately transmits the indication instruction to the target wireless communicator-indicator.

4. The picking system according to claim 1,
wherein the indicator-side short-distance wireless communication circuit receives the indication instruction as a radio wave, converts the energy of the received radio wave into electric power, and records or outputs electronic information that reflects reception of the indication instruction by using the electric power, and
wherein each of the wireless communicator-indicators performs indication based on the electronic information via the indication unit.

5. The picking system according to claim 1,
wherein the indicator-side short-distance wireless communication circuit is an RFID tag, and the transport-side short-distance wireless communication circuit is a communication circuit that communicates with the RFID tag.

6. The picking system according to claim 1,
wherein the management apparatus and the autonomous transport device communicate with each other via a wireless LAN.

7. The picking system according to claim 1,
wherein the indication unit of each of the wireless communicator-indicators includes a light emitter that emits light for indication and a photovoltaic cell that generates electric power used by the light emitter to emit light.

* * * * *